UNITED STATES PATENT OFFICE 2,602,778

METHOD AND COMPOSITION FOR TREATING WELLS

Ernest F. Snyder, Long Beach, and Carl S. Seybold, Jr., Los Angeles, Calif.

No Drawing. Application March 10, 1949, Serial No. 80,773

9 Claims. (Cl. 252—8.55)

This invention relates to a method and composition for treating wells and is particularly concerned with a method and composition for the removal of all types of drilling fluid filter cake sheaths at the time of completion of the well, and for the removal of waxy masses or other detrimentally deposited materials which are normally encountered in the production of petroleum from producing wells:

Waxy masses or "paraffin" is a term commonly applied in drilling and production practice and is a combination of precipitated and deposited mineral salts, oil, mud, silt, sand, water, gums and resins in an asphaltic matrix of "paraffinic." Such waxy masses or "paraffin" may vary widely in composition ranging from a soft mushy liquid, through a plastic mass, to a hard granular solid. The composition and process of the present invention is designed to break down such detrimentally deposited materials or "paraffin" so as to allow them to accumulate in a place for removal from the well. Thus in one form of the process of the present invention after a well has been completed and has been placed on production with the result that such waxy masses or "paraffin" have been deposited so as to prevent adequate production, the well is treated as hereafter described for the removal of such "paraffin" or other detrimentally deposited materials and thereby the maximum productive capacity of the well restored.

The composition and process of the present invention is also utilized for the treatment of wells before they are placed on production. During the drilling of wells for oil and gas a drilling fluid is used to carry out cuttings and to lubricate the drilling bit. In addition, the drilling fluid plasters or deposits a tough, semiplastic sheath on the face of the hole which reduces the loss of fluid into the surrounding formation. Upon completion of the well and before placing it on production it is desirable that this deposited sheath of material be removed so that the formation will be restored to its natural permeability. The composition and process of this invention, by removing the drilling fluid sheath, increases the productivity of the well and allows for the production of fluid from the well with a smaller pressure draw down.

The waxy masses or "paraffin" which are encountered in petroleum production or the sheaths of material deposited during the drilling of the well are removed by treating the well with the composition of the present invention. This composition consists of an aqueous solution containing a protein hydrolysate, calcium chloride and a nonionic detergent.

Proteins undergo hydrolysis successively from proteoses, then peptones, then polypeptides, then simple peptides, and finally amino acids. In the process of the present invention any hydrolyzed protein may be used, either by itself or in combination with one or more other hydrolyzed protein materials and such products may be employed whether the protein hydrolysate is produced from either simple proteins, conjugated proteins or derived proteins. In selecting which of the several protein hydrolysates are to be used in the process of the present invention consideration need be given mainly only to the factors of the availability and cost, it being manifest that many proteins which when hydrolyzed although capable of serving in the process of the present invention may not be readily obtainable, or may be excessively high in cost. Hydrolyzed proteins are generally produced by either one of two methods. In one method a protein, or a group of proteins, may be hydrolyzed by treatment with an acid at an elevated temperature. By such treatment the protein molecule is broken down into water soluble amino acids. After the hydrolysis the acid product is neutralized with caustic soda or soda ash, so that from this method of hydrolysis employed the product produced contains sodium chloride as a contaminant. This contaminant, however, is not detrimental in the process of the present invention. Another method of hydrolyzing proteins is by the use of proteolytic enzymes. In such a process the proteinic material such as fish scrap, meat scrap, casein, soya beans, etc. are first macerated and the batch then heated to a temperature of about 120° F. when the proteolytic enzyme is added. For example, the proteolytic enzyme may be pancreatin, which is an enzyme extracted from animal pancreas. The degree of hydrolysis is governed by the amount of enzyme added. When the batch has reached the stage where the water soluble amino acids are at a maximum, the temperature of the batch is increased to destroy the enzymatic action and stop any further hydrolysis. In the case of fish scrap, the material is commonly hydrolyzed to a degree of about 60 to 70%. At this point water soluble amino acids are present along with a dipeptide and tripeptide linkage between the amino acid molecules. If the hydrolysis is continued on beyond the 60 to 70% point the dipeptide and the tripeptide linkage is destroyed and only the amino acids remain.

In the process of the present invention we generally employ protein hydrolysates which have been hydrolyzed to a degree of at least about 50% and can employ the completely hydrolyzed proteins, although further hydrolysis beyond the 60 to 70% point is of no advantage in the process of the present invention and unnecessarily increases the cost of the protein hydrolysate to be used in the process.

In the process of the present invention, protein hydrolysates can be derived from a very large variety of protein materials. Thus, for example, among the animal proteins usable are the albumen of eggs and milk, casein of milk, gelatin, the globulin of milk or eggs, and fish and meat scrap. Among the vegetable proteins which may be used are the glutenin of wheat, zein of maize, collagen from gelatin, legumin of lentil, the gliadin of wheat, the glucinin of soya bean, and the nucleoprotein of yeast. A highly satisfactory protein hydrolysate for the process of the present invention (except as to the element of cost) is one which is composed of the combination of enzymatically hydrolyzed protein derived from casein and yeast, this product being readily obtainable on the market. The particular proportions of casein and yeast employed for producing such a product are arbitrary as far as the use of the product for the purpose of the present invention is concerned. The product on the market, however, is derived using a major portion of casein and a minor proportion of yeast. A number of industrial protein hydrolysates which are on the market have been employed in the process of the present invention but the main sources of protein hydrolysates on the market are high in cost in comparison with the preferred materials. In the preferred process of the present invention the protein hydrolysate is obtained from hydrolyzed meat scrap or fish scrap. In both cases the final amino acid content is approximately the same. Likewise, the products obtained from hydrolyzing both fish and animal scrap contain approximately the same group of amino acids. The most economical source of protein hydrolysates for the process of the present invention is by the hydrolysis of fish scrap. By the enzymatic proteolytic digest of fish scrap conducted to about the 60 to 70% point a product is produced which is a brown colored liquid having a total solids content of about 25 to 27%, a specific gravity between 8.8 and 8.9 pounds per gallon at 70° C., an ash content of about 2 to 3%, about 1 to 2% of lipoids, and percentage of total nitrogen in the form of alpha amino acids (by formal titration) of 60% or better We have discovered that protein hydrolysates or compositions containing the same have the property of deflocculating deposited drilling fluid sheaths and deposited waxy masses, "paraffin" and other detrimentally deposited materials in oil and gas wells. The action of the protein hydrolysates in oil wells is considerably enhanced by adding thereto a chloride of an alkali or alkali earth metal and a nonionic detergent. Of the chlorides available calcium chloride is to be preferred although other chlorides, such as sodium chloride, may be used in certain cases. By the addition of calcium chloride to the protein hydrolysate a composition is produced which, in contact with drilling mud, has the property of assisting and preventing the swelling of bentonitic materials which may be present in the well and thus facilitates the protein hydrolysate employed in deflocculating detrimentally deposited materials from the well, and also facilitates the penetration of the protein hydrolysate into productive formations where the protein hydrolysate may act to increase the permeability of such formations and enhance the productivity of producing wells.

By the inclusion in the composition of a nonionic detergent the disintegrating and decomposing effect of the composition on resinous and bituminous or other detrimentally deposited materials in the well hole is further increased. The nonionic type of detergent material is employed for the purpose in the process of the present invention for the reason that such detergent material is not precipitated by hard water or alkaline earth or heavy metal salt solution, whereas other detergents such, for example, as anionic surface active agents may undergo some precipitation with the resulting reduction in the permeability of the formations of the well.

The nonionic detergents which are used in the composition of the process of the present invention are non-ionizable and owe their effectiveness to a proper balance between certain hydrophilic (polar) and lyophilic (non-polar) groups in their molecules. The hydrophilic character is usually obtained by the presence of a certain minimum of accumulated polar groups such as free hydroxy or ether-oxygen groups. The nonionic detergents include the partial esters of polyhydric alcohols with long chain carboxylic acids; the partial and complete esters of certain water soluble hydroxy-alkyl ethers of polyhydric alcohols with long chain carboxylic acids; the ethers of polyhydric alcohols with long chain fatty alcohols; short chain hydroxy-alkyl ethers of polyhydric alcohols esterified with long chain fatty alcohols; long chain alcohols with a number of free hydroxyl groups; esters of long chain alcohols with polyhydroxy acids; long chain acetals of polyhydric alcohols; condensation products of fatty acids with protein decomposition products, amides prepared with long chain amines and polyhydroxy acids.

Examples of the nonionic detergents used in the process and composition of the present invention are Triton X-100, which is an alkylated aryl poly-ether alcohol of substantially the following formula: polyethylene glycol mono iso octyl phenyl ether. Likewise, Levelene may be employed, which is a high molecular organic condensation product of the polyethylene type with a specific gravity of 1.0315 and a pH of 7.0. Other nonionic detergents which have been used in the process and composition of the present invention include Glim, which is an ethylene oxide condensation product; Span 20, which is a sorbitan monolaurate; Tween 40, which is a polyoxyalkylene ether of partial palmitic acid ester; Antarox E-100, Antarox B-290 and Antarox A-200, which are polyglycol and polyglycol ether-esters; Emcol #12, which is a fatty acid ester of a polyhydric alcohol, and Claurin, which is a diethylene glycol monolaurate.

In the composition and in the process of the present invention there is employed an aqueous solution which generally contains from, at least, 2 to 15%, preferably between 5 and 15% of protein hydrolysate, about ½ to 3% of an alkaline earth chloride such as calcium chloride, and from ¼ to 2% of a nonionic detergent. We have tested compositions of substantially the above proportions in the treatment of wells and by such procedure have been able to effect substantial increases in the production of the wells treated thereby.

In treating a well using the composition of the present invention the sheaths or "paraffin" to be decomposed can be subjected to the action of the composition in various ways which will readily occur to those skilled in the art. For example, the composition may be circulated through the well or can be inserted in the well and the well then swabbed. It also may be spotted in the well hole opposite the sheathing or "paraffin" to be decomposed. The invention is useful where a liner of a well is to be treated for the removal of the sheathing either inside or exterior to the liner, in which case the composition is spotted at the liner and then the liner cleaned using any usual or preferred washer, including a pressure type washer. The pressure washer may then be removed and followed by the use of a suction washer. At the end of such washing operation, in addition to removal of decomposed or disintegrated detrimentally deposited materials, it will frequently be found possible to remove from the well hole fragments of "paraffin" or asphaltic sheathing, which fragments indicate there has been originally present a solid sheathing of a consistency of asphaltic concrete of a thickness of about ⅜ inch.

By the composition and process of the present invention resinous paraffin and asphaltic sheathing may be decomposed and removed so as to develop or restore to the well maximum productivity where, due to the use of previous compositions, such sheathings were substantially unaffected. Moreover, by the means of the present invention the action of detergent material is effected without the loss of permeability of the formation such as occurs with previous efforts to employ such detergents.

While the particular examples of the composition and method herein described are well adapted to carry out the objects of the invention, various modifications and changes may be made and this invention includes such modifications and changes as come within the scope set forth in the appended claims.

We claim:

1. A method of treating an oil or gas well which comprises washing said well with an aqueous solution containing a protein hydrolysate hydrolyzed to a degree of between 50 and 100%, a solution also containing a member of the group consisting of an alkali earth chloride and an alkali chloride and a nonionic detergent.

2. A method of treating an oil or gas well which comprises washing said well with an aqueous solution containing a protein hydrolysate, calcium chloride and a nonionic detergent, the protein hydrolysate being between 50 and 100% hydrolyzed.

3. A method of treating an oil or gas well which comprises washing said well with an aqueous solution containing a protein hydrolysate, calcium chloride and a nonionic detergent, the protein hydrolysate being derived from the enzymatic hydrolyzation of fish scrap, the hydrolyzation being between 50 and 100% complete.

4. A method of treating an oil or gas well which comprises washing said well with an aqueous solution containing a protein hydrolysate, calcium chloride and a nonionic detergent, the protein hydrolysate being derived from the enzymatic hydrolyzation of fish scrap, the hydrolyzation being between 50 and 100% complete, the protein hydrolysates being present in proportions of from 2 to 15%, the alkaline earth chloride being present in proportions of ½ to 3%, and the nonionic detergent being present in proportions of ¼ to 2%.

5. A composition for treating wells which comprises a protein hydrolysate, a member of the group consisting of an alkali earth chloride and an alkali chloride and a nonionic detergent.

6. A composition for treating wells which comprises a protein hydrolysate, a member of the group consisting of an alkali earth chloride and an alkali chloride and a nonionic detergent, the protein hydrolysate being between 50 and 100% hydrolyzed.

7. A method of treating an oil or gas well comprising washing said well with an aqueous solution containing a protein hydrolysate, calcium chloride and a nonionic detergent, the protein hydrolysate being derived from the enzymatic hydrolyzation of fish scrap and being between 50 and 100% hydrolyzed.

8. A composition for treating wells which comprises a solution of between 2 and 15% of a protein hydrolysate, between ½ and 3% of calcium chloride, and between ¼ to 2% of a nonionic detergent, the protein hydrolysate being between 50 and 100% hydrolyzed.

9. A composition for treating wells which comprises a solution of between 2 and 15% of a protein hydrolysate, between ½ and 3% of calcium chloride, and between ¼ to 2% of a nonionic detergent, the protein hydrolysate being derived from fish scrap and being between 50 and 100% hydrolyzed.

ERNEST F. SNYDER.
CARL S. SEYBOLD, Jr.

REFERENCES CITED

The following references are of record in the file of this patent:

UNITED STATES PATENTS

| Number | Name | Date |
|---|---|---|
| 1,498,045 | Lake | June 17, 1924 |
| 2,135,589 | Monson | Nov. 8, 1938 |
| 2,322,484 | Stuart | June 22, 1943 |
| 2,324,951 | Ratzer | July 20, 1943 |
| 2,431,256 | Keil | Nov. 18, 1947 |
| 2,445,029 | Jones | July 13, 1948 |
| 2,459,708 | Lundgren | Jan. 18, 1949 |